(12) United States Patent
Kishioka et al.

(10) Patent No.: US 8,486,524 B2
(45) Date of Patent: Jul. 16, 2013

(54) DOUBLE-SIDED PRESSURE-SENSITIVE ADHESIVE TAPE

(75) Inventors: Hiroaki Kishioka, Ibaraki (JP); Katsunari Oji, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 857 days.

(21) Appl. No.: 11/859,021

(22) Filed: Sep. 21, 2007

(65) Prior Publication Data

US 2008/0076310 A1    Mar. 27, 2008

(30) Foreign Application Priority Data

Sep. 21, 2006    (JP) .................................. 2006-255530

(51) Int. Cl.
*B32B 5/02*    (2006.01)
(52) U.S. Cl.
USPC ............................. 428/343; 442/152; 442/153
(58) Field of Classification Search
USPC ................................... 428/343; 442/152, 153
See application file for complete search history.

(56) References Cited

U.S. PATENT DOCUMENTS

2002/0013109 A1 *    1/2002    Nissing ......................... 442/153

FOREIGN PATENT DOCUMENTS

| JP | 7-70527 A | 3/1995 |
| JP | 8-20754 A | 1/1996 |
| JP | 9-272850 A | 10/1997 |
| JP | 2000-265140 A | 9/2000 |
| JP | 2000-265143 A | 9/2000 |
| JP | 2000-303041 A | 10/2000 |
| JP | 2001-72951 A | 3/2001 |
| JP | 2005-60633 A | 3/2005 |
| JP | 2005060633 A * | 3/2005 |

* cited by examiner

*Primary Examiner* — Matthew Matzek
(74) *Attorney, Agent, or Firm* — Sughrue Mion, PLLC

(57) ABSTRACT

The present invention relates to a double-sided pressure-sensitive adhesive tape comprising a nonwoven fabric as a support; one pressure-sensitive adhesive layer disposed on one side of the support; and another pressure-sensitive adhesive layer disposed on the other side of the support, wherein the nonwoven fabric consists of Manila hemp and is impregnated with carboxymethyl cellulose. The double-sided pressure-sensitive adhesive tape according to the invention can be produced with a high productivity, does not cause shrinkage wrinkles even when prepared by direct application, and has good blanking workability owing to its small elongation and excellent strength.

4 Claims, 2 Drawing Sheets

DOUBLE-SIDED PRESSURE-SENSITIVE ADHESIVE TAPE

FIELD OF THE INVENTION

The present invention relates to a double-sided pressure-sensitive adhesive tape employing a nonwoven fabric as a support. In particular, the present invention relates to a double-sided pressure-sensitive adhesive tape excellent in blanking workability and used for the adhesion between a molded or formed material made of metal, plastic or the like and a member such as plastic and foam product.

BACKGROUND OF THE INVENTION

Double-sided pressure-sensitive adhesive tapes have been used widely for the adhesion between a molded or formed product and a member of household electric appliances and office automation equipment owing to its handling use and good adhesion characteristics. For example, there is known a releasable type double-sided pressure-sensitive adhesive tape including a nonwoven fabric as a support and pressure-sensitive adhesive layers disposed on both sides of the support, which is characterized in that it has a strength at yield point from 20 to 40 (N/20 mm) in each of the machine direction and transverse direction, an elongation at yield point not greater than 10%, and a strength at break higher than strength at yield point (refer to JP-A-2005-60633). There is also known a double-sided pressure-sensitive adhesive tape employing a nonwoven fabric made of Manila hemp (for example, refer to JP-A-9-272850, JP-A-2001-72951, JP-A-2000-265140, JP-A-2000-265143, JP-A-2000-303041, and JP-A-7-70527).

These double-sided pressure-sensitive adhesive tapes however have a problem that when the pressure-sensitive adhesive layers are formed on both sides of the nonwoven fabric by directly applying a pressure-sensitive adhesive thereto and drying, fine shrinkage wrinkles appear during winding and storing of the tape in the form of a roll after application and drying.

As a method of preventing such generation of wrinkles during storage, known is a manufacturing method of a double-sided pressure-sensitive adhesive tape comprising applying a solvent type pressure-sensitive adhesive to one side of a release paper subjected to release treatment and drying it to form a pressure-sensitive adhesive layer; attaching the resulting pressure-sensitive adhesive layer to both sides of a base material sheet, releasing one of the release papers, and then winding the base material sheet together with the other release paper; wherein after the solvent type pressure-sensitive adhesive is applied to the surface of the release papers prepared by directly applying a releasing agent to glassine paper, which surface has been subjected to release treatment, and the solvent pressure-sensitive adhesive is foamed at a foaming ratio of from 1.1 to 1.3 under heating, the resulting release papers are attached to the both surfaces of the base material sheet, respectively, one of the release papers is peeled and removed, and then the base material sheet is wound together with the remaining release paper (refer to JP-A-8-20754).

In the above-described method, however, the pressure-sensitive adhesive layer is formed by so-called transfer, that is, lamination after formation of the pressure-sensitive adhesive layer on the release paper. It is inferior in productivity to formation of the pressure-sensitive adhesive layer by direct application.

Moreover, in adhesion of small parts, when a half cut of a tape is performed with a release paper as a board or blanking processing is performed after the tape is attached to a foamed product, use of a stretchy tape sometimes results in reduction in a production yield because of deformation at the time of cutting or occurrence of defective blanking. A tape with smaller elongation is sometimes demanded. In such a case, an impregnant is ordinarily employed for decreasing the tape elongation and improving the tape tensile strength. However, a nonwoven fabric impregnated with an impregnant tends to cause shrinkage wrinkles when a pressure-sensitive adhesive is transferred to the fabric and thus adjustment of tension is necessary. Moreover, when a pressure-sensitive adhesive is applied directly, this problem cannot be overcome only by the adjustment of tension.

When a pressure-sensitive adhesive layer is formed by direct application, which provides good productivity, in particular in the case of a double-sided pressure-sensitive adhesive tape using as a support a nonwoven fabric containing an impregnant and exhibiting a small tape elongation, an effective means for preventing shrinkage wrinkles at the time of manufacture or storage has not yet been proposed.

SUMMARY OF THE INVENTION

An object of the invention is to overcome the above-described problem and provide a double-sided pressure-sensitive adhesive tape employing a nonwoven fabric as a base material, which is excellent in workability and does not generate fine shrinkage wrinkles.

The present inventors have carried out an extensive investigation in order to attain the above-described object. As a result, it is found that the target characteristics are available by using a nonwoven fabric consisting of Manila hemp and moreover, using carboxymethyl cellulose as an impregnant, thereby leading to the completion of the invention.

DETAILED DESCRIPTION OF THE INVENTION

Figure 1:
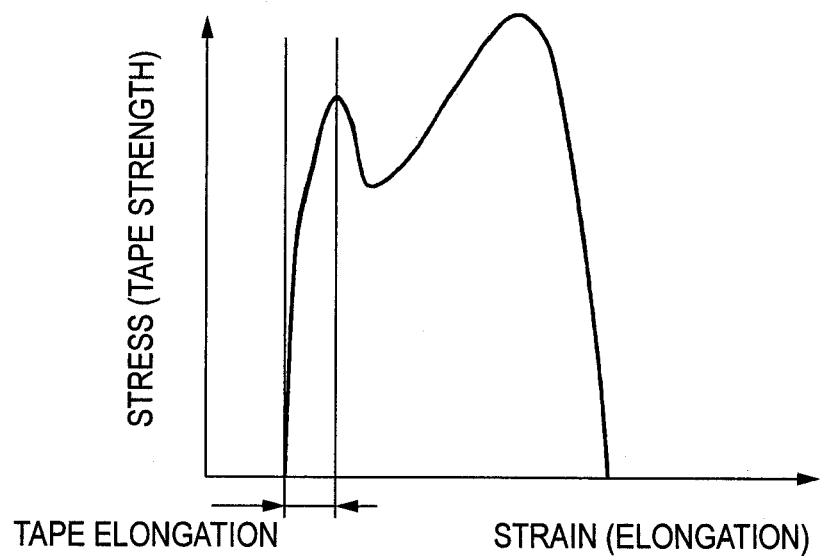
FIG. 1 is a diagram (stress-strain curve) showing one example of the reading method of a tape elongation of the double-sided pressure-sensitive adhesive tape of the invention.

Namely, the present invention relates to the following (1) to (4).

(1) A double-sided pressure-sensitive adhesive tape comprising:
a nonwoven fabric as a support;
one pressure-sensitive adhesive layer disposed on one side of the support; and
another pressure-sensitive adhesive layer disposed on the other side of the support,
wherein the nonwoven fabric consists of Manila hemp and is impregnated with carboxymethyl cellulose.

(2) The double-sided pressure-sensitive adhesive tape according to (1), wherein at least one of said pressure-sensitive adhesive layers is formed by applying said pressure-sensitive adhesive directly to the support.

(3) The double-sided pressure-sensitive adhesive tape according to (1) or (2), wherein said pressure-sensitive adhesive layers disposed on both sides of the support are formed by successively or simultaneously applying said pressure-sensitive adhesive directly to the support.

(4) The double-sided pressure-sensitive adhesive tape according to any one of (1) to (3), wherein said tape has a tape tensile strength in each of the machine direction and transverse direction of from 7 to 20 (N/10 mm), and wherein said tape has a tape elongation in each of the machine direction and transverse direction of less than 15%, wherein the tape elongation is an elongation at a yield point of a stress-strain curve in tensile test.

According to the invention, a double-sided pressure-sensitive adhesive tape which does not cause shrinkage wrinkles even when prepared by direct application of the pressure-sensitive adhesive, exhibits small elongation and is excellent in strength is available by using, as a support, a nonwoven fabric made using only Manila hemp as a fibrous raw material and impregnated with carboxymethyl cellulose.

The double-sided pressure-sensitive adhesive tape of the invention will hereinafter be described more specifically.

The double-sided pressure-sensitive adhesive tape of the invention has a plurality of pressure-sensitive adhesive layers on both sides of a support. The pressure-sensitive adhesive layer preferably constitutes the uppermost layer of the adhesive tape.

Nonwoven Fabric (Support)

As the support of the double-bonded adhesive tape of the invention, a nonwoven fabric is used. The nonwoven fabric according to the invention consists of Manila hemp. The term "nonwoven fabric consisting of Manila hemp" as used herein means that only fibers of Manila hemp are used as fibrous raw materials constituting the nonwoven fabric. The nonwoven fabric using only Manila hemp as a fibrous raw material is presumed not to cause shrinkage wrinkles easily because they are all long fibers and entanglements or contact points between fibers are not so many so that stress is dispersed all over the fibers. A fabric manufactured by mixing short fibers such as wood pulp in long fibers such as Manila hemp is presumed to cause shrinkage wrinkles because entanglements or contact points between fibers are so many in a portion of short fibers, which is presumed to cause stress concentration easily.

In the invention, the nonwoven fabric is impregnated with carboxymethyl cellulose (CMC) used as an impregnant. The concentration of carboxymethyl cellulose in a treatment agent (aqueous solution) is preferably from 0.5 to 2.5 wt. %, more preferably from 1.0 to 2.0 wt. %. Although the application method of the impregnant is not particularly limited, examples thereof include size press, gate roll and rod metering. In the invention, by impregnating the nonwoven fabric with carboxymethyl cellulose, it becomes possible to improve the tape tensile strength and to suppress elongation of tape without causing shrinkage wrinkles. Viscose or the like conventionally used as an impregnant adheres uniformly to the whole fibers and limits free movement thereof so that use of it tends to deteriorate the flexibility of fibers. Carboxymethyl cellulose to be used in the invention, on the other hand, adheres only to the contact points of the fibers so that the fibers themselves do not lose their flexibility. It is presumed that the stress is therefore dispersed over the whole fibers, leading to suppression of shrinkage wrinkles.

The manufacturing method of the nonwoven fabric of the invention is not particularly limited and a conventionally known wet process is usable. The paper making machine usable in the invention is not also particularly limited and cylinder machine, short-wire machine, fourdrinier machine, and inclined short-wire machine may be used. Of these, inclined short-wire system is preferred for obtaining a nonwoven fabric having a high grain ratio.

The basis weight of the nonwoven fabric according to the invention is preferably from 10 to 25 g/m$^2$, more preferably from 15 to 20 g/m$^2$. When the basis weight of the nonwoven fabric is less than 10 g/m$^2$, since the strength of the nonwoven fabric is low, the double-sided pressure-sensitive adhesive tape sometimes tends to break at the time of releasing the tape or pulling the tape from a foamed product to which it is attached in some cases. When the basis weight exceeds 25 g/m$^2$, on the other hand, the resulting double-sided pressure-sensitive adhesive tape has deteriorated flexibility so that wrinkles are generated in a transverse direction when the tape is taken up on a paper core and they detract from the appearance in some cases.

The density of the nonwoven fabric according to the invention is preferably from 0.15 to 0.35 g/m$^3$, more preferably from 0.2 to 0.3 g/m$^3$. When the nonwoven fabric has a density less than 0.15 g/m$^3$, since the strength of the nonwoven fabric is low, the double-sided pressure-sensitive adhesive tape sometimes tends to break at the time of releasing of the tape or pulling the tape from a foamed product to which it is attached in some cases. When it has a density exceeding 0.35 g/m$^3$, on the other hand, the double-sided pressure-sensitive adhesive tape sometimes breaks between layers of the nonwoven fabric upon releasing of the tape in some cases, because deteriorated impregnation properties of the pressure-sensitive adhesive disturb the pressure-sensitive adhesive from exhibiting a sufficient binder effect.

The tensile strength of the nonwoven fabric according to the invention is preferably from 7 to 20 (N/10 mm), more preferably from 10 to 20 (N/10 mm) in each of a machine direction (MD) and transverse direction (TD). When the tensile strength in either one of the MD direction and TD direction is less than 7 (N/10 mm), the double-sided pressure-sensitive adhesive tape sometimes tends to break at the time of releasing of the tape or pulling the tape from a foamed product to which it is attached. When the tensile strength in either one of the MD direction and TD direction exceeds 20 (N/10 mm), conformability to irregularities may sometimes deteriorate owing to reduction in the flexibility of the double-sided pressure-sensitive adhesive tape. The tensile strength of the nonwoven fabric can be controlled by freeness, density or thickness thereof.

The grain ratio (tensile strength in TD/tensile strength in MD) of the nonwoven fabric according to the invention is preferably from 70 to 100%, more preferably from 80 to 100%. Grain ratios less than 70% cause deterioration in isotropy of mechanical properties such as strength and elongation so that the resulting double-sided pressure-sensitive adhesive tape sometimes tends to break in a direction of lower strength at the time of releasing the tape.

Pressure-Sensitive Adhesive

As the pressure-sensitive adhesive constituting the pressure-sensitive adhesive layer of the double-sided pressure-sensitive adhesive tape of the invention, conventionally known ones in pressure-sensitive adhesive tapes are usable. For example, pressure-sensitive adhesives such as rubber-based pressure-sensitive adhesive, acrylic pressure-sensitive adhesive, and silicone-based pressure-sensitive adhesive may be used.

An appropriate additive such as crosslinking agent (for example, isocyanate crosslinking agent or epoxy crosslinking agent), tackifier (for example, rosin derivative resin, polyterpene resin, petroleum resin or oil soluble phenol resin), plasticizer, filler or antioxidant may be added to the pressure-sensitive adhesive according to the necessity.

The rubber-based pressure-sensitive adhesive is a pressure-sensitive adhesive obtained by incorporating an additive such as tackifier resin in an elastomer. Examples thereof include those containing, as a base polymer, a natural rubber or synthetic rubber such as polyisoprene rubber, styrene•butadiene (SB) rubber, styrene•isoprene (SI) rubber, styrene•isoprene•styrene block copolymer (SIS) rubber, styrene•butadiene•styrene block copolymer (SBS) rubber, styrene•ethylene•butylene•styrene block copolymer (SEBS) rubber, styrene•ethylene•propylene•styrene block copolymer (SEPS) rubber, styrene•ethylene•propylene block copolymer (SEP) rubber, regenerated rubber, butyl rubber and polyisobutyrene and modified products thereof.

The acrylic adhesive contains, as a base polymer, an acrylic polymer composed of a copolymer of an alkyl acrylate and/or alkyl methacrylate (which will hereinafter be called "alkyl (meth)acrylate") or a copolymer of the alkyl(meth)acrylate and another unsaturated monomer.

The acrylic polymer used as a base polymer of the acrylic pressure-sensitive adhesive has an alkyl(meth)acrylate as an essential constituent monomer component. The acrylic polymer is typically a copolymer of two or more monomer components. It may be a copolymer obtained using only two or more alkyl(meth)acrylates as monomer components or a copolymer obtained using one or more alkyl(meth)acrylate and another unsaturated monomer as copolymer components. The acrylic pressure-sensitive adhesive may be a mixture of two or more acrylic polymers different from each other.

Examples of the alkyl(meth)acrylate monomer unit include esters of acrylic acid or methacrylic acid having a linear or branched alkyl group having 30 or less carbon atoms, preferably from 4 to 18 carbon atoms such as methyl, ethyl, propyl, isopropyl, n-butyl, t-butyl, isobutyl, amyl, isoamyl, hexyl, heptyl, cyclohexyl, 2-ethylhexyl, octyl, isooctyl, nonyl, isononyl, decyl, isodecyl, undecyl, lauryl, tridecyl, tetradecyl, stearyl, octadecyl, and dodecyl.

Examples of the another unsaturated monomer include carboxyl-containing monomers such as acrylic acid, methacrylic acid, carboxyethyl acrylate, carboxypentyl acrylate, itaconic acid, maleic acid, fumaric acid, and crotonic acid; acid anhydride monomers such as maleic anhydride and itaconic anhydride; hydroxyl-containing monomers such as 2-hydroxyethyl(meth)acrylate, 2-hydroxypropyl(meth)acrylate, and 4-hydroxybutyl(meth)acrylate; sulfonic-acid-containing monomers such as styrenesulfonic acid, allylsulfonic acid, 2-(meth)acrylamido-2-methylpropanesulfonic acid, and (meth)acrylamidopropanesulfonic acid; phosphoric-acid-containing monomers such as 2-hydroxyethyl acryloylphosphate; (N-substituted)amide monomers such as (meth)acrylamide, N-butyl(meth)acrylamide, N-methylol (meth)acrylamide and N-methylolpropane(meth)acrylamide; aminoalkyl(meth)acrylate monomers such as aminoethyl(meth)acrylate and N,N-dimethylaminoethyl(meth) acrylate; alkoxyalkyl(meth)acrylate monomers such as methoxyethyl(meth)acrylate and ethoxyethyl(meth)acrylate; maleimide monomers such as N-cyclohexylmaleimide and N-isopropylmaleimide; itaconimide monomers such as N-methylitaconimide and N-ethylitaconimide; succinimide monomers such as N-(meth)acryloyloxymethylenesuccinimide and N-(meth)acryloyl-6-oxyhexamethylenesuccinimide; vinyl monomers such as vinyl acetate, vinyl propionate, N-vinylpyrrolidone, methylvinylpyrrolidone, styrene, and α-methylstyrene; cyanoacrylate monomers such as acrylonitrile and methacrylonitrile; epoxy-containing acrylic monomers such as glycidyl(meth)acrylate; glycol acrylate monomers such as polyethylene glycol(meth)acrylate and polypropylene glycol(meth)acrylate; acrylate monomers having a heterocycle, halogen atom, silicon atom or the like, such as tetrahydrofurfuryl(meth)acrylate, fluoro(meth)acrylate, and silicone(meth)acrylate; polyfunctional monomers such as hexanediol di(meth)acrylate, (poly)ethylene glycol di(meth) acrylate, (poly)propylene glycol di(meth)acrylate, neopentyl glycol di(meth)acrylate, pentaerythritol di(meth)acrylate, trimethylolpropane tri(meth)acrylate, pentaerythritol tri(meth) acrylate, dipentaerythritol hexa(meth)acrylate, epoxy acrylate, polyester acrylate, and urethane acrylate; olefin monomers such as isoprene, butadiene and isobutylene; and vinyl ether monomers such as vinyl ether. These monomers may be used either singly or in combination of two or more thereof.

The acrylic polymer has a weight average molecular weight of preferably from 100,000 to 2,000,000, more preferably from 300,000 to 800,000.

As the pressure-sensitive adhesive of the invention, it is preferable to use an acrylic pressure-sensitive adhesive composed mainly of an acrylic polymer and usable in the form of a solution in a hydrocarbon solvent. In particular, it is preferable to use an acrylic pressure-sensitive adhesive which will be a pressure-sensitive adhesive layer having a storage elastic modulus (G') (temperature: 25° C.) of from about $4.5 \times 10^4$ Pa to $6.0 \times 10^4$ Pa is preferred because it provides good releasability. The storage elastic modulus (G') can be measured, for example, by using a dynamic viscoelasticity measurement apparatus ("RDS-11", trade name; product of Rheometrics, Inc.). It can be measured using a jig of a parallel plate having a diameter of 7.9 mm at a frequency of 1 Hz while using a solid content of the acrylic pressure-sensitive adhesive with a thickness of about 1.5 mm as a sample.

The storage elastic modulus (G') can be controlled by properly selecting the kind or mixing ratio of a monomer of the acrylic polymer constituting the acrylic pressure-sensitive adhesive, kind or use amount of a polymerization initiator, kind or use amount of a crosslinking gent, polymerization process or the like. The followings describe preferable conditions thereof.

Of the above-described acrylic polymers, those having a (meth)acrylate as a main component are preferred, of which $C_{4-12}$ (meth)acrylates are more preferred, with butyl acrylate, 2-ethylhexyl acrylate, ethyl acrylate and methyl acrylate being still more preferred.

Furthermore, it is preferable to use a carboxyl-containing monomer as a copolymerization monomer together with the main monomer. Specific examples thereof include (meth) acrylic acid, itaconic acid, crotonic acid, maleic acid and fumaric acid. These monomers may be used either singly or in combination of two or more thereof. A copolymerization ratio of the copolymerization monomer is preferably from 1 to 10 parts by weight based on 100 parts by weight of the whole monomer. When the copolymerization ratio is less than 1 part by weight, good adhesion to an adherend cannot always be ensured. When the copolymerization ratio exceeds 10 parts by weight, on the other hand, it may cause problems such as poor applicability due to a rise in viscosity of the pressure-sensitive adhesive.

Examples of the typical polymerization process of the acrylic polymer include solution polymerization, emulsion polymerization, and UV polymerization. From the viewpoints of transparency, water resistance and cost, the solution polymerization is preferred.

Examples of the initiator for solution polymerization include azo initiators such as 2,2'-azobisisobutyronitrile, 2,2'-azobis(4-methoxy-2,4-dimethylvaleronitrile), 2,2'-azobis(2, 4-dimethylvaleronitrile), 2,2'-azobis(2-methylbutyronitrile), 1,1'-azobis(cyclohexane-1-carbonitrile), 2,2'-azobis(2,4,4-trimethylpentane) and dimethyl 2,2'-azobis(2-methylpropionate); and peroxide initiators such as benzoyl peroxide, t-butyl hydroperoxide, di-t-butyl peroxide, t-butylperoxy benzoate, dicumyl peroxide, 1,1-bis(t-butylperoxy)3,3,5-trimethylcyclohexane and 1,1-bis(t-butylperoxy)cyclododecane. These oil-soluble initiators may be used either singly or in combination of two or more thereof. The initiator may be used in a conventional amount and is not particularly limited, but it is added preferably in an amount of, for example, from about 0.01 to 1 part by weight based on 100 parts by weight of all the monomers.

In the polymerization, ordinarily employed solvents can be used. One or more solvents such as ethyl acetate, toluene, n-butyl acetate, n-hexane, cyclohexane, methyl ethyl ketone and methyl isobutyl ketone can be used.

To the pressure-sensitive adhesive composition, a crosslinking agent may be added. As the crosslinking agent, conventional ones can be used. Examples thereof include polyfunctional melamine compounds such as methylated methylolmelamine and butylated hexamethylolmelamine, polyfunctional epoxy compounds such as diglycidyl aniline and glycerin diglycidyl ether, and polyfunctional isocyanate compounds such as tolylene diisocyanate, hexamethylene diisocyanate, polymethylene polyphenylisocyanate, diphenylmethane diisocyanate, trimethylolpropane tolylene diisocyanate, polyether polyisocyanate and polyester polyisocyanate. They may be used either singly or in combination of two or more thereof The crosslinking agent is added in an amount of preferably from 0.01 to 20 parts by weight, more preferably from 0.1 to 10 parts by weight based on 100 parts by weight of the polymer (for example, acrylic polymer).

The pressure-sensitive adhesive of the invention may be applied directly to a nonwoven fabric by a roll coater or the like, or may be applied by forming a pressure-sensitive adhesive layer on a release paper and then transferring it to a nonwoven fabric. Particularly in the invention, direct application to a nonwoven fabric is preferred from the standpoint of improving productivity. It is preferred to form the pressure-sensitive adhesive layer on at least one side of the nonwoven fabric by direct application, more preferably on both sides thereof by direct application. When a plurality of pressure-sensitive adhesive layers are formed on both surfaces of the nonwoven fabric by direct application, the pressure-sensitive adhesive may be applied on both surfaces simultaneously or the pressure-sensitive adhesive may be applied on one surface, followed by the subsequent application of the pressure-sensitive adhesive to the other surface.

The thickness of the pressure-sensitive adhesive layer is not particularly limited, but is preferably from 30 to 100 μm, more preferably from 50 to 80 μm.

Double-Sided Pressure-Sensitive Adhesive Tape

The tensile strength of the double-sided pressure-sensitive adhesive tape of the invention is preferably from 7 to 20 (N/10 mm), more preferably from 10 to 20 (N/10 mm) in each of the machine direction (MD) and transverse direction (TD). It can be controlled mainly by adjusting the tensile strength of the nonwoven fabaric.

The tape elongation (elongation at yield point of a stress-strain curve in tensile test) of the double-sided pressure-sensitive adhesive tape of the invention is preferably less than 15%, more preferably less than 10% in each of the MD direction and TD direction from the viewpoint of blanking workability. The tape elongation can be controlled by freeness, fiber length, fiber diameter or the like.

The grain ratio (tensile strength in TD/tensile strength in MD) of the double-bonded adhesive tape of the invention is preferably from 80 to 100%, more preferably from 90 to 100%. When the grain ratio is less than 80%, deterioration in isotropy of mechanical properties such as strength and elongation occurs and the tape tends to break in a direction of lower strength upon releasing of the tape in some cases.

Materials for which the double-sided pressure-sensitive adhesive tape of the invention is suitably used are not particularly limited, but the tape is used preferably for the adhesion of members (such as formed or molded member, expanded product and the like) made of a metal, plastic, glass, wood, rubber or the like material. It is particularly suitable for the adhesion between a liquid crystal panel of a mobile phone and the body thereof because it undergoes less deformation and is excellent in blanking workability.

Methods for Measuring Physical Properties and Evaluating Advantages

Examples of the measuring method and evaluation method of advantages to be used in the present application will next be shown.

(1) Tensile Strength

The measurement method of a tensile strength according to the invention will next be explained with reference to the measurement method of a tensile strength in MD.

A test piece of 10 mm wide in the form of a strip was cut in MD from a double-sided pressure-sensitive adhesive tape (or nonwoven fabric). The test piece was subjected to a tensile test (until breakage) by using a tensile tester under the conditions of a chuck-to-chuck distance of 50 mm and pulling rate of 100 mm/min. The maximum stress was taken as the tensile strength of MD.

(2) Tape Elongation

A tensile test was performed as in the above-described test and elongation (%) from the starting of the measurement to the yield point was taken as a tape elongation.

Figure 2:
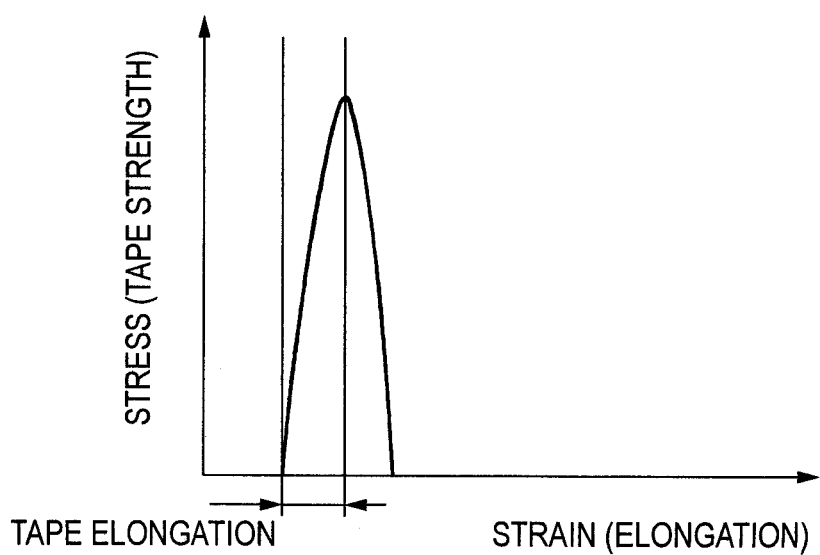
FIG. 2 is a diagram (stress-strain curve) showing another example of the reading method of a tape elongation of the double-sided pressure-sensitive adhesive tape of the invention.
Figure 3:
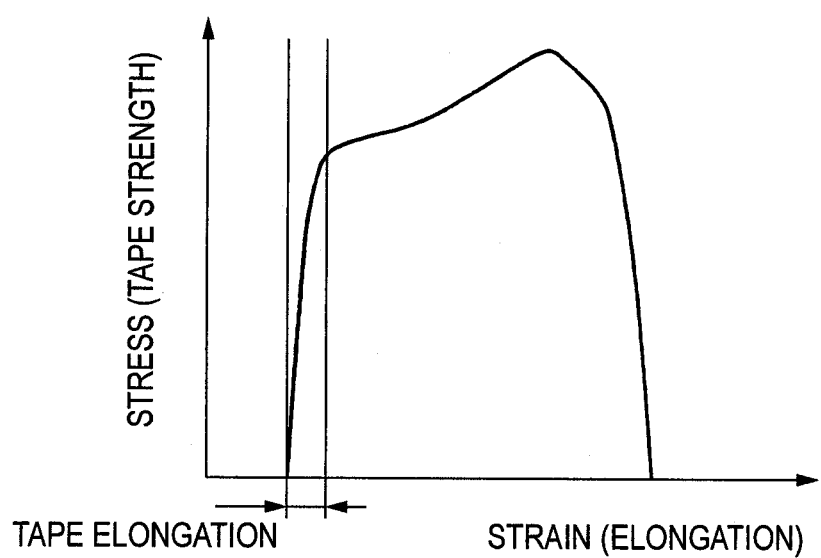
FIG. 3 is a diagram (stress-strain curve) showing a further example of the reading method of a tape elongation of the double-sided pressure-sensitive adhesive tape of the invention.

The method for reading the yield point in the stress-strain curve obtained in the tensile test is shown in FIGS. 1 to 3. When the stress-strain curve obtained in the tensile test has a typical yield point (FIG. 1), the elongation from the starting point of the measurement (starting point of the strain) to the yield point (upper yield point) is taken as a tape elongation. When the yield point is not clear (FIGS. 2 and 3), a first point at which the slope of the stress-strain curve shows a drastic drop is taken as the yield point and a tape elongation is calculated based on it.

(3) Workability

Tape elongations (in MD and TD) of the double-sided pressure-sensitive adhesive tapes obtained in Examples and Comparative Examples were measured in accordance with (2) above. When the tape elongations in both MD and TD were less than 15%, the workability of the tape was judged good (A), while the tape elongations in at least one of MD and TD were 15% or greater, the workability was judged poor (B).

(4) Shrinkage Wrinkles

The double-sided pressure-sensitive adhesive tapes (taken up on a roll) obtained in Examples and Comparative Examples were stored for 25 days under the atmosphere of 50° C. (corresponding to condition at 20° C. for 2 years in Arrhenius theory).

Shrinkage wrinkles on the surface of the tape just after taking-up of the tape and after storage for 25 days were observed visually and judged in accordance with the following criteria:

A (Excellent): No shrinkage wrinkles were observed.
B (Good): Less than 5 shrinkage wrinkles were observed within an area of 50 mm (width)×100 mm (length).
C (Poor): At least 5 shrinkage wrinkles were observed within an area of 50 mm (width)×100 mm (length).

EXAMPLES

The present invention will be described in further detail by Examples. However, the present invention is not limited to these Examples.

Example 1

A nonwoven fabric was obtained by subjecting 100% of Manila hemp to an inclined short-wire machine and applying a 2.0% aqueous solution of carboxymethyl cellulose (CMC) by a size press system. The nonwoven fabric thus obtained had a basis weight of 15 g/m$^2$, density of 0.21 g/m$^3$ and grain ratio of 89%.

On the other hand, 5 parts by weight of acrylic acid, 95 parts by weight of butyl acrylate and 200 parts by weight of toluene as a polymerization solvent were charged in a three-neck flask and they were stirred for 2 hours while introducing a nitrogen gas thereinto. After removal of oxygen from the polymerization system in the above-described manner, 0.1 part by weight of benzoyl peroxide was added. Polymerization reaction was conducted for 3 hours at a temperature elevated to 65° C., and then for 2 hours at 80° C. The acrylic polymer thus obtained had a weight average molecular weight of 550,000. To 100 parts by weight of the solid content of the resulting polymer was added 2 parts by weight of an isocyanate crosslinking agent ("Coronate L", trade name; product of Nippon Polyurethane Industry Co., Ltd.). They were stirred sufficiently to prepare an acrylic pressure-sensitive adhesive.

The resulting pressure-sensitive adhesive was directly applied to one of the surfaces of the nonwoven fabric. After drying at 100° C. for 2 minutes, a paper separator (separator of 0.13 mm thickness obtained by laminating both sides of a bond paper with polyethylene, followed by subjecting them to a release treatment) was attached to this surface. The pressure-sensitive adhesive was applied to the other surface similarly and then dried to obtain a double-sided pressure-sensitive adhesive tape (tape thickness: 0.14 mm) equal in the thickness (60 μm) of pressure-sensitive adhesive layer on both surfaces. The double-sided pressure-sensitive adhesive tape thus obtained was wound around a core having a diameter of 6 inches. Rewinding and cutting of the tape were conducted to obtain a double-sided pressure-sensitive adhesive tape (in the form of a roll, length: 50 m) of 50 mm wide.

Examples 2 to 4

In each of Examples 2 to 4, in a similar manner to Example 1 except for the use of a nonwoven fabric (prepared by a papermaking step employing nipping) different in basis weight, density or the like as shown in Table 1, a double-sided pressure-sensitive adhesive tape (in the form of a roll) of 50 mm wide was obtained.

Example 5

In a similar manner to Example 1 by using the nonwoven fabric employed in Example 1 as a support but changing the formation method of a pressure-sensitive adhesive layer to simultaneous application on both surfaces as shown in Table 1, a double-sided pressure-sensitive adhesive tape (in the form of a roll) of 50 mm wide was obtained.

Example 6

A nonwoven fabric similar to that employed in Example 1 was used as a support as shown in Table 1. A pressure-sensitive adhesive (similar to that employed in Example 1) was applied to a paper separator (separator of 0.13 mm thickness, obtained by laminating both sides of a bond paper with polyethylene, followed by subjecting them to a release treatment) and then dried to form a pressure-sensitive adhesive layer. One of the surfaces of the nonwoven fabric was laminated with the resulting pressure-sensitive adhesive layer. On the other surface of the nonwoven fabric, a pressure-sensitive adhesive layer was formed, as in Example 1, by directly applying the pressure sensitive adhesive to the surface and then drying. A double-sided pressure-sensitive adhesive tape (in the form of a roll) of 50 mm wide was thus obtained.

Comparative Example 1

As shown in Table 2, a nonwoven fabric using as raw materials 70% of Manila hemp and 30% of wood pulp and having a changed basis weight and density was used. A pressure-sensitive adhesive layer was formed in a similar manner to Example 5, that is, simultaneous application to both surfaces, and a double-sided pressure-sensitive adhesive tape (in the form of a roll) of 50 mm wide was obtained as in Example 1.

Comparative Example 2

As shown in Table 2, a nonwoven fabric using viscose as an impregnant and having a changed basis weight and density was used. A pressure-sensitive adhesive layer was formed in a similar manner to Example 5, that is, simultaneous application to both surfaces, and a double-sided pressure-sensitive adhesive tape (in the form of a roll) of 50 mm wide was obtained as in Example 1.

Comparative Example 3

As shown in Table 2, a nonwoven fabric using no impregnant and having a changed basis weight and density was used. A pressure-sensitive adhesive layer was formed in a similar manner to Example 5, that is, simultaneous application to both surfaces, and a double-sided pressure-sensitive adhesive tape (in the form of a roll) of 50 mm wide was obtained as in Example 1.

As shown in Tables 1 and 2, the double-sided pressure-sensitive adhesive tapes (obtained in Examples 1 to 6) of the invention were excellent because they had excellent workability and caused less shrinkage wrinkles. The nonwoven fabric using a mixture of Manila hemp and wood pulp or the nonwoven fabric not using carboxymethyl cellulose as an impregnant (Comparative Examples 1 and 2) caused shrinkage wrinkles. The nonwoven fabric using no impregnant showed a large tape elongation and inferior workability. Each of them did not simultaneously satisfy the workability and prevention of shrinkage wrinkles.

TABLE 1

|  |  | Ex. 1 | Ex. 2 | Ex. 3 | Ex. 4 | Ex. 5 | Ex. 6 |
|---|---|---|---|---|---|---|---|
| Support | Raw material fiber | Manila hemp | Manila hemp | Manila hemp | Manila hemp | Manila hemp | Manila hemp |
|  | Impregnant | CMC | CMC | CMC | CMC | CMC | CMC |
|  | Basis weight of nonwoven fabric (g/cm$^2$) | 15 | 21 | 15 | 17 | 15 | 15 |
|  | Density of nonwoven fabric (g/cm$^2$) | 0.21 | 0.27 | 0.27 | 0.22 | 0.21 | 0.21 |
|  | Strength of nonwoven fabric (MD) (N/15 mm) | 9 | 17 | 10 | 12 | 9 | 9 |
|  | Strength of nonwoven fabric (TD) (N/15 mm) | 8 | 16 | 9 | 10 | 8 | 8 |
|  | Grain ratio (%) | 89 | 94 | 90 | 83 | 89 | 89 |
| Application adhesive | method of pressure-sensitive | Direct/Direct (Successive) | Direct/Direct (Successive) | Direct/Direct (Successive) | Direct/Direct (Successive) | Direct/Direct (Simultaneous) | Transfer/Direct (Successive) |
| Double-sided pressure-sensitive adhesive tape | Tape strength (MD) (N/10 mm) | 10 | 15 | 11 | 13 | 10 | 10 |
|  | Tape strength (TD) (N/10 mm) | 10 | 14 | 10 | 14 | 10 | 10 |
|  | Grain ratio (%) | 100 | 93 | 91 | 93 | 100 | 100 |
|  | Tape elongation (MD) (%) | 6.0 | 7.0 | 6.0 | 7.0 | 6.0 | 6.0 |
|  | Tape elongation (TD) (%) | 10.0 | 11.0 | 9.0 | 10.0 | 10.0 | 10.0 |
|  | Workability | A | A | A | A | A | A |
|  | Shrinkage wrinkles | A | B | B | A | A | B |

TABLE 2

|  |  | Comp. Ex. 1 | Comp. Ex. 2 | Comp. Ex. 3 |
|---|---|---|---|---|
| Support | Raw material fiber | Manila hemp/wood pulp | Manila hemp | Manila hemp |
|  | Impregnant | CMC | Viscose | — |
|  | Basis weight of nonwoven fabric (g/cm$^2$) | 16 | 14 | 14 |
|  | Density of nonwoven fabric (g/cm$^2$) | 0.30 | 0.31 | 0.25 |
|  | Strength of nonwoven fabric (MD) (N/15 mm) | 16 | 15 | 7 |
|  | Strength of nonwoven fabric (TD) (N/15 mm) | 14 | 15 | 7 |
|  | Grain ratio (%) | 88 | 100 | 100 |
| Application adhesive | method of pressure-sensitive | Direct/Direct (Simultaneous) | Direct/Direct (Simultaneous) | Direct/Direct (Simultaneous) |
| Double-sided pressure-sensitive adhesive tape | Tape strength (MD) (N/10 mm) | 11 | 13 | 10 |
|  | Tape strength (TD) (N/10 mm) | 11 | 13 | 10 |
|  | Grain ratio (%) | 100 | 100 | 100 |
|  | Tape elongation (MD) (%) | 3.0 | 6.0 | 40 |
|  | Tape elongation (TD) (%) | 8.0 | 10.0 | 45 |
|  | Workability | A | A | B |
|  | Shrinkage wrinkles | C | C | B |

Note)
CMC: carboxymethyl cellulose

While the present invention has been described in detail and with reference to specific embodiments thereof, it will be apparent to one skilled in the art that various changes and modifications can be made therein without departing from the scope thereof.

This application is based on Japanese patent application No. 2006-255530 filed Sep. 21, 2006, the entire contents thereof being hereby incorporated by reference.

Further, all references cited herein are incorporated in their entireties.

What is claimed is:

1. A double-sided pressure-sensitive adhesive tape comprising:
   a nonwoven fabric as a support;
   one pressure-sensitive adhesive layer disposed on one side of the support; and
   another pressure-sensitive adhesive layer disposed on the other side of the support,
   wherein the nonwoven fabric consists of Manila hemp that is impregnated with carboxymethyl cellulose.

2. The double-sided pressure-sensitive adhesive tape according to claim 1, wherein at least one of said pressure-sensitive adhesive layers is formed by applying said pressure-sensitive adhesive directly to the support.

3. The double-sided pressure-sensitive adhesive tape according to claim 1, wherein said pressure-sensitive adhesive layers disposed on both sides of the support are formed by successively or simultaneously applying said pressure-sensitive adhesive directly to the support.

4. The double-sided pressure-sensitive adhesive tape according to claim 1, wherein said tape has a tape tensile strength in each of the machine direction and transverse direction of from 7 to 20 (N/10 mm), and wherein said tape has a tape elongation in each of the machine direction and transverse direction of less than 15%, wherein the tape elongation is an elongation at a yield point of a stress-strain curve in tensile test.

* * * * *